United States Patent
Byford et al.

(10) Patent No.: US 10,507,851 B1
(45) Date of Patent: Dec. 17, 2019

(54) RAILCAR BEARING AND WHEEL MONITORING SYSTEM

(71) Applicants: Leo Byford, Tulsa, OK (US); Kenneth Zweiacher, Owasso, OK (US)

(72) Inventors: Leo Byford, Tulsa, OK (US); Kenneth Zweiacher, Owasso, OK (US)

( * ) Notice: Subject to any disclaimer, the term of this patent is extended or adjusted under 35 U.S.C. 154(b) by 205 days.

(21) Appl. No.: 15/820,846

(22) Filed: Nov. 22, 2017

Related U.S. Application Data

(63) Continuation-in-part of application No. 15/651,847, filed on Jul. 17, 2017, now abandoned, which is a continuation of application No. 14/808,449, filed on Jul. 24, 2015, now Pat. No. 9,707,982.

(60) Provisional application No. 62/028,614, filed on Jul. 24, 2014.

(51) Int. Cl.
| | |
|---|---|
| *G01M 17/00* | (2006.01) |
| *B61K 9/04* | (2006.01) |
| *G01M 17/10* | (2006.01) |
| *B60B 27/00* | (2006.01) |
| *B61K 9/12* | (2006.01) |
| *B61F 15/20* | (2006.01) |

(52) U.S. Cl.
CPC ............ *B61K 9/04* (2013.01); *B60B 27/0068* (2013.01); *B61F 15/20* (2013.01); *B61K 9/12* (2013.01); *G01M 17/10* (2013.01)

(58) Field of Classification Search
CPC ............ B61K 9/04; B61K 9/12; G01M 17/10
See application file for complete search history.

(56) References Cited

U.S. PATENT DOCUMENTS

| | | | | |
|---|---|---|---|---|
| 9,073,559 | B2 * | 7/2015 | Kilian | B61K 9/06 |
| 2007/0208841 | A1 * | 9/2007 | Barone | B61L 15/0027 |
| | | | | 709/223 |
| 2007/0255509 | A1 * | 11/2007 | LeFebvre | B61F 5/305 |
| | | | | 702/33 |
| 2008/0028368 | A1 | 1/2008 | Depew et al. | |
| 2008/0137062 | A1 | 6/2008 | Holton et al. | |
| 2008/0283681 | A1 * | 11/2008 | Hershey | B61K 9/04 |
| | | | | 246/169 A |
| 2010/0155543 | A1 * | 6/2010 | Hesser | B61K 9/06 |
| | | | | 246/169 D |
| 2010/0204857 | A1 * | 8/2010 | Forrest | B61L 27/0094 |
| | | | | 701/19 |

(Continued)

FOREIGN PATENT DOCUMENTS

| | | | |
|---|---|---|---|
| CN | 201214431 Y | * | 4/2009 |
| EP | 2131167 | | 12/2009 |

(Continued)

*Primary Examiner* — Jamel E Williams
(74) *Attorney, Agent, or Firm* — Gable Gotwals

(57) ABSTRACT

A system continuously monitors bearing temperature and wheel surface condition. The system may include a button contact sensor for sensing wheel bearing temperature and a measuring laser for detecting wheel breakage. The system may also include a vibration sensor, sound sensor, and a load sensor. Each sensor is in communication with a receiver/transmitter and may be mounted to the railcar by way of a friction lock magnetic mounting. Computer means may be used to store, analyze, and present the collected information for use in deciding whether, for example, the train should be slowed or stopped. A solar panel may provide power to the components.

23 Claims, 4 Drawing Sheets

(56) References Cited

U.S. PATENT DOCUMENTS

| | | | |
|---|---|---|---|
| 2011/0035093 A1* | 2/2011 | Moench | G01P 3/366 |
| | | | 701/31.4 |
| 2012/0150370 A1* | 6/2012 | Oldknow | B61K 9/08 |
| | | | 701/19 |
| 2018/0067003 A1* | 3/2018 | Michiwaki | G01L 1/22 |

FOREIGN PATENT DOCUMENTS

| | | | | |
|---|---|---|---|---|
| EP | 2131167 A1 * | 12/2009 | | G01G 19/042 |
| KR | 101130798 | 3/2012 | | |

* cited by examiner

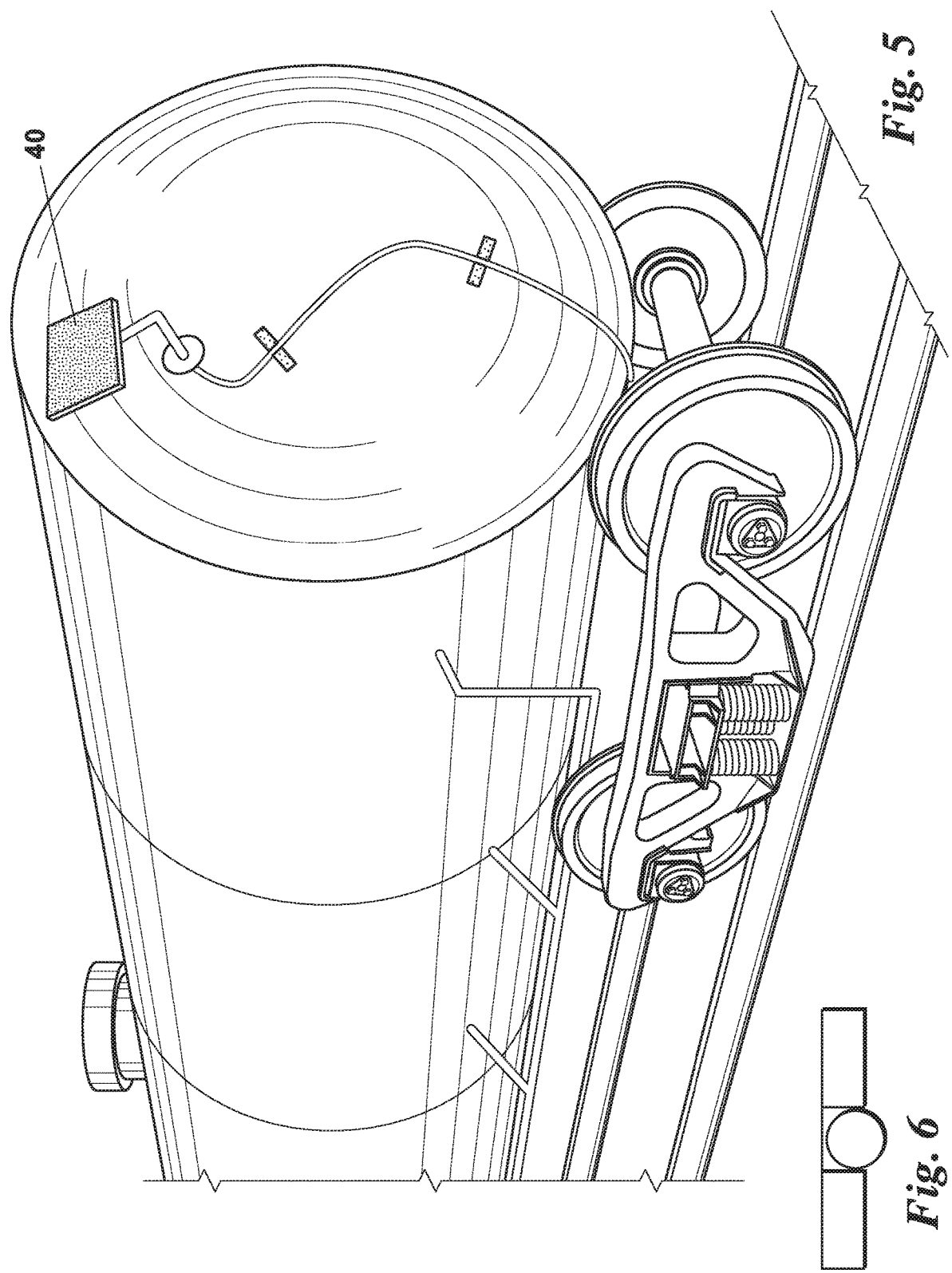

RAILCAR BEARING AND WHEEL MONITORING SYSTEM

CROSS-REFERENCE TO PENDING APPLICATIONS

This application claims priority to U.S. application Ser. No. 15/651,847, filed Jul. 17, 2017, which claimed priority to U.S. application Ser. No. 14/808,449, filed Jul. 24, 2015, now U.S. Pat. No. 9,707,982, which claimed priority to U.S. Prov. Pat. Appl. Ser. No. 62/028,614, filed Jul. 24, 2014, the contents of which are hereby incorporated by reference.

BACKGROUND

This invention generally relates to systems and devices used to monitor the condition of railcar components when in use. More specifically, the invention relates to systems used to monitor the condition of railcar wheel bearings and wheel conditions.

Current systems to monitor railcar wheel bearings and wheel conditions are located at wayside stations. A need exists for onboard, continuous monitoring of the bearings and wheels.

SUMMARY

A system made according to this invention continuously monitors bearing temperature and wheel surface condition. The system may include a button contact sensor for sensing wheel bearing temperature and a measuring laser for detecting wheel breakage. The system may also include a vibration sensor, sound sensor, and a load sensor. Each sensor is in communication with a receiver/transmitter and may be mounted to the railcar by way of a friction lock magnetic mounting. Computer means may be used to store, analyze, and present the collected information for use in deciding whether, for example, the train should be slowed or stopped. A solar panel may provide power to the components.

BRIEF DESCRIPTION OF THE DRAWINGS

FIG. 5 is an alternate mounting for the power source.

FIG. 6 is an enlarged view of a powerline hold-down clip of FIG. 5.

DETAILED DESCRIPTION OF THE PREFERRED EMBODIMENTS

Figure 1:
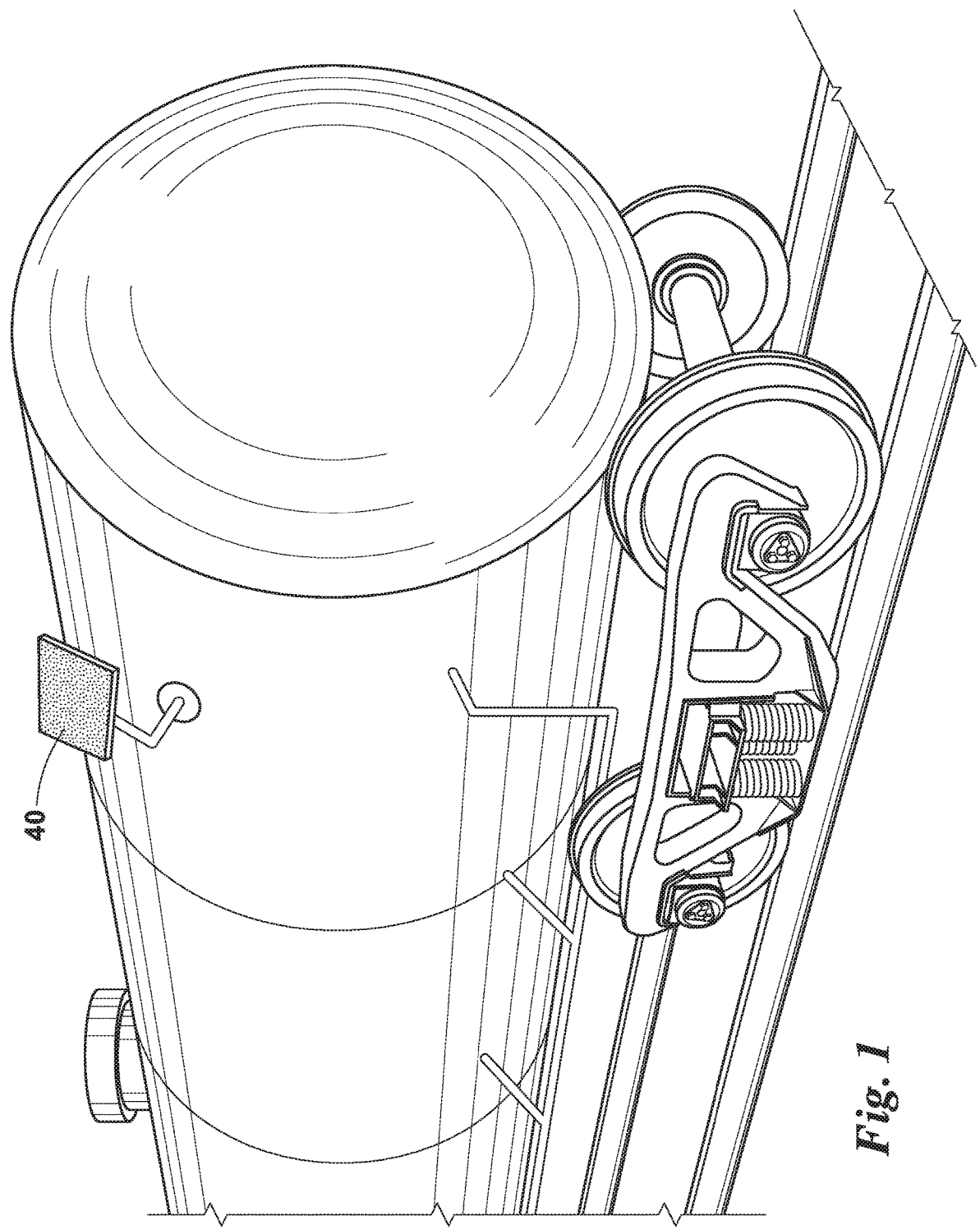
FIG. 1 is an isometric view of an embodiment of the system mounted to a railcar.
Figure 2:
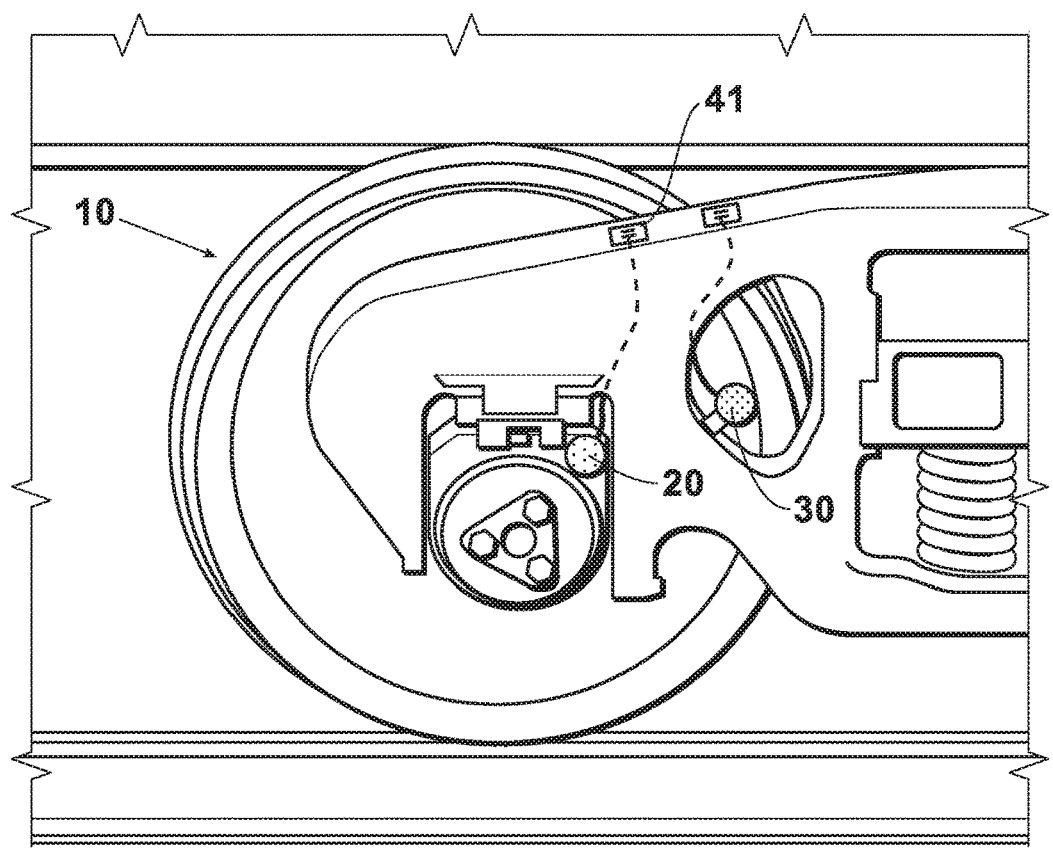
FIG. 2 is an isometric view of an embodiment mounted to a bogie or wheel of a railcar.
Figure 3:
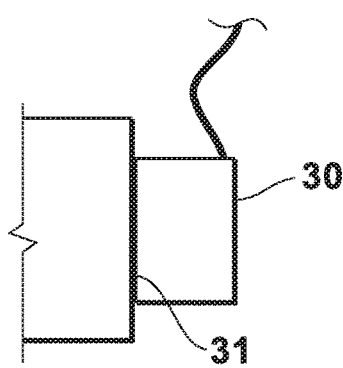
FIG. 3 is an enlarged view of the temperature sensor of FIG. 2.
Figure 4:
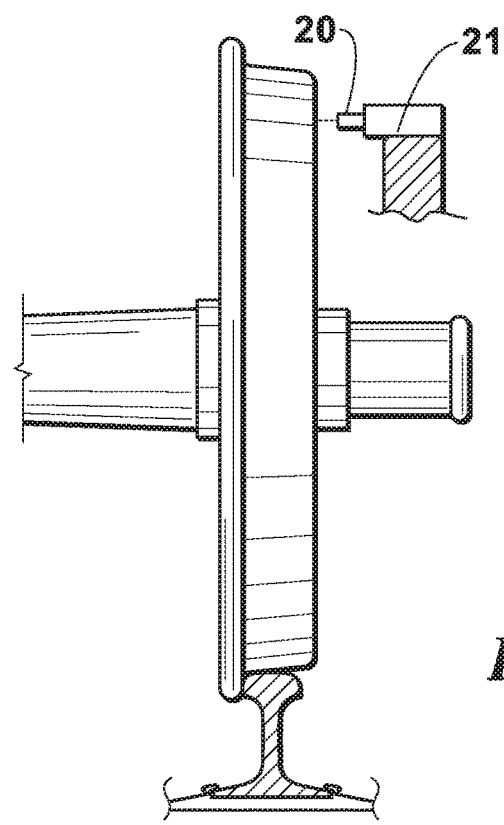
FIG. 4 is an enlarged view of the measuring laser of FIG. 2.

Referring to FIGS. 1 to 6, embodiments of the system 10 continuously monitors bearing temperature and wheel surface condition of a railcar bogie or wheel and transmits the temperature and surface conditions to the engineer's laptop, mobile device, or their equivalent.

Bearing temperature is monitored using a button contact sensor 20 located on the railcar in close proximity to the wheel, preferably on the wheel bearing cover box. Wheel condition is monitored using a measuring laser 30 located on the railcar in close proximity to the wheel, preferably on the bogie rail. Each sensor 20, 30 is in communication with a receiver/transmitter and is mounted to the railcar by way of a friction lock magnetic mounting 21, 31. A solar panel 40 and associated plugs or connectors 41 provides power to the components.

Providing power to the sensors 20, 30 and receiving and transmitting data collected by the sensors 20, 30 are done by means well known in the art. For example, the button contact sensor 20, measuring laser 30, and wireless transmitter are available through Omega Engineering, Inc. (Stamford, Conn.). The data collected by the temperature sensor 20 and measuring laser 30 are compared to predefined operating parameters to determine whether the bogie is in a safe or unsafe condition.

Figure 7:
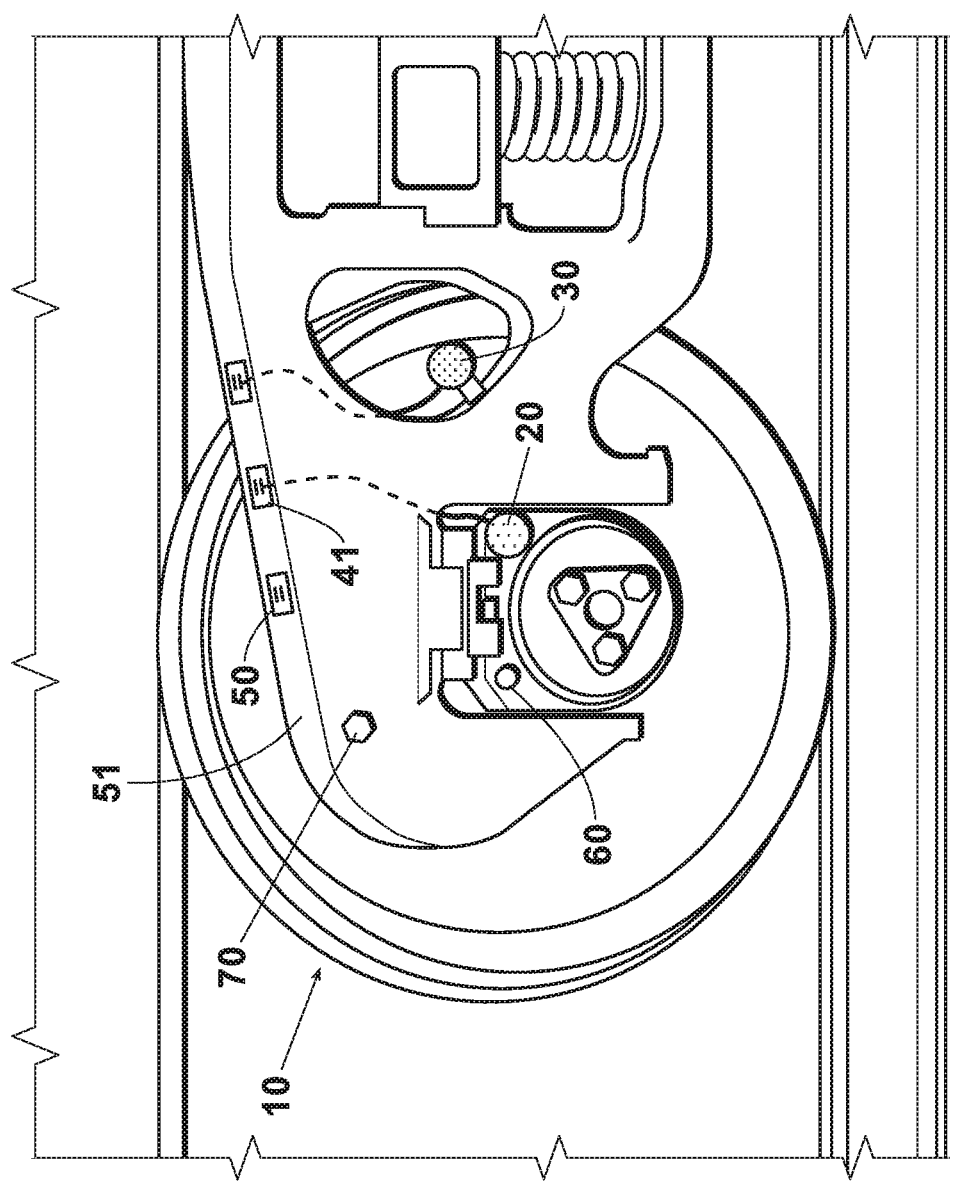
FIG. 7 is an isometric view of another embodiment of the system mounted to a bogie or wheel of a railcar.

Referring now to FIG. 7, in embodiments at least one other sensor 50, 60, or 70 may be used to provide additional information on wheel bearing conditions. The sensor 50, 60, or 70 may be powered by the solar panel 40 and associated plugs or connectors 41.

In embodiments, a vibration sensor 50 may be mounted along the top rail 51 of the railcar bogie. The vibration sensor 50 is configured to sense wheel bearing vibration and send these vibration signals to a computer for processing. The sensor 50 may also be configured to only detect vibrations indicative of a bad or deteriorating wheel bearing condition. The computer, which may be a laptop or table computer, or a mobile device, can be located in the locomotive for use by the engineer. The computer may store, analyze, and present vibration information to the engineer so that a decision can be made relative to safe operation of the train.

In embodiments, a sound sensor 60—which may be a weather hardened, temperature and shock resistant industrial microphone or its equivalent—may be mounted in close proximity to the outer race and roller bearing group of the wheel. Similar to the vibration sensor 50, the sound sensor 60 may be configured to detect certain frequencies of sound that indicate a bad or deteriorating wheel or axle bearing condition. The sound sensor 60 may add additional detection when used in combination with the vibration sensor and, therefore, provide additional information for the engineer to view and consider. For example, the collected sound data may indicate a failure of an axle bearing and bogie wheel.

In other embodiments, a load- or tension-indicating bolt 70 may be connected to the top rail 51. For example, the bolt 70 may be inserted through a hole in the rail 51 and secured with a nut. Similar to the other sensors 20, 30, 50, 60 the bolt 70 may be configured to detect certain loads and send load data to the computer where it may be stored, analyzed, and presented for decision making.

What is claimed:

1. A railcar bogie continuous monitoring system comprising:
   a button contact temperature sensor located on a railcar wheel bearing cover box of a railcar wheel;
   a wheel breakage measuring laser located on a railcar bogie rail of the railcar wheel and directed horizontally toward a face of the railcar wheel;
   a vibration sensor located on the railcar bogie rail;
   a sound sensor located in proximity to the railcar wheel bearing cover box; and
   a load sensor located on the railcar bogie rail;
     wherein the railcar wheel bearing cover box and the railcar bogie rail is for a same wheel of a railcar.

2. A railcar bogie continuous monitoring system according to claim 1 further comprising at least one of the wheel breakage measuring laser and said sensors including a friction lock magnetic mounting.

3. A railcar bogie continuous monitoring system according to claim 1 further comprising the sound sensor including a weather-, temperature-, and shock-resistant microphone.

4. A railcar bogie continuous monitoring system according to claim 1 further comprising the load sensor being a load indicating bolt passing through the railcar bogie rail.

5. A railcar bogie continuous monitoring system according to claim 1 further comprising means for powering at least one of the wheel breakage measuring laser and said sensors.

6. A railcar bogie continuous monitoring system according to claim 5 wherein the means for powering includes a solar panel.

7. A railcar bogie continuous monitoring system according to claim 1 further comprising means for wirelessly transmitting data collected by at least one of the wheel breakage measuring laser and said sensors.

8. A railcar bogie continuous monitoring system according to claim 1 further comprising computer means for processing data collected by at least one of the wheel breakage measuring laser and said sensors.

9. A railcar bogie continuous monitoring system according to claim 1 further comprising at least one of the wheel breakage monitoring laser and said sensors configured to detect a signal outside of a normal operating range.

10. A railcar bogie continuous monitoring system comprising:
    a button contact temperature sensor located on a railcar wheel bearing cover box of a railcar wheel;
    a wheel breakage measuring laser located on a railcar bogie rail of the railcar wheel and directed horizontally toward a face of the railcar wheel; and
    at least one other sensor selected from the group consisting of a vibration sensor located on the railcar bogie rail, a sound sensor located in proximity to the railcar wheel bearing cover box, and a load sensor located on the railcar bogie rail;
    wherein the railcar wheel bearing cover box and the railcar bogie rail is for a same wheel of a railcar.

11. A railcar bogie continuous monitoring system according to claim 10 further comprising at least one of the button contact temperature sensor, wheel breakage measuring laser, and the at least one other sensor including a friction lock magnetic mounting.

12. A railcar bogie continuous monitoring system according to claim 10 wherein the sound sensor includes a weather-, temperature-, and shock-resistant microphone.

13. A railcar bogie continuous monitoring system according to claim 10 wherein the load sensor is a load indicating bolt passing through the railcar bogie rail.

14. A railcar bogie continuous monitoring system according to claim 10 further comprising means for powering at least one of the button contact temperature sensor, the wheel breakage measuring laser, and the at least one other sensor.

15. A railcar bogie continuous monitoring system according to claim 14 wherein the means for powering includes a solar panel.

16. A railcar bogie continuous monitoring system according to claim 10 further comprising means for wirelessly transmitting data collected by at least one of the button contact temperature sensor, the wheel breakage measuring laser, and the at least one other sensor.

17. A railcar bogie continuous monitoring system according to claim 10 further comprising computer means for processing data collected by at least one of the button contact sensor, the wheel breakage measuring laser, and the at least one other sensor.

18. A railcar bogie continuous monitoring system according to claim 1 further comprising at least one of the button contact temperature sensor, the wheel breakage monitoring laser, and the at least one other sensor configured to detect a signal outside of a normal operating range.

19. A railcar bogie continuous monitoring system comprising:
    at least one of a button contact temperature sensor located on a railcar wheel bearing cover box of a railcar wheel and a wheel breakage measuring laser located on a railcar bogie rail of the railcar wheel and directed horizontally toward a face of the railcar wheel; and
    at least one other sensor selected from the group consisting of a vibration sensor located on the railcar bogie rail, a sound sensor located in proximity to the railcar wheel bearing cover box, and a load sensor located on the railcar bogie rail;
    wherein the railcar wheel bearing cover box and the railcar bogie rail is for a same wheel of a railcar.

20. A method for continuous monitoring of a railcar bogie, the method comprising:
    monitoring a bearing temperature via a temperature sensor located on a railcar wheel bearing cover box of a railcar wheel and at least one other sensor; and
    monitoring a wheel condition via a wheel breakage measuring laser located on a railcar bogie rail of the railcar wheel;
    wherein the at least one other sensor is selected from the group consisting of a vibration sensor located on the railcar bogie rail, a sound sensor located in proximity to the railcar wheel bearing cover box, and a load sensor located on the railcar bogie rail;
    wherein the railcar wheel bearing cover box and the railcar bogie rail is for a same wheel of a railcar.

21. A method according to claim 20 wherein the temperature sensor is a button contact sensor.

22. A method according to claim 20 wherein the wheel breakage measuring laser is directed horizontally toward a face of the railcar wheel.

23. A method according to claim 20 further comprising transmitting bearing condition data and the wheel condition data to a computer means configured to analyze said transmitted data.

* * * * *